US011021259B1

(12) United States Patent
Jarvinen

(10) Patent No.: US 11,021,259 B1
(45) Date of Patent: Jun. 1, 2021

(54) AIRCRAFT EXHAUST MITIGATION SYSTEM AND PROCESS

(71) Applicant: Philip Onni Jarvinen, Nashua, NH (US)

(72) Inventor: Philip Onni Jarvinen, Nashua, NH (US)

(*) Notice: Subject to any disclaimer, the term of this patent is extended or adjusted under 35 U.S.C. 154(b) by 0 days.

(21) Appl. No.: 17/143,676

(22) Filed: Jan. 7, 2021

(51) Int. Cl.
*B64D 33/04* (2006.01)
*B01D 53/32* (2006.01)
*F01N 3/08* (2006.01)

(52) U.S. Cl.
CPC ............. *B64D 33/04* (2013.01); *B01D 53/32* (2013.01); *F01N 3/08* (2013.01); *B01D 2259/818* (2013.01)

(58) Field of Classification Search
None
See application file for complete search history.

(56) References Cited

U.S. PATENT DOCUMENTS

| 683,088 | A | 9/1901 | Wideen | |
|---|---|---|---|---|
| 1,620,633 | A | 3/1927 | Colvin | |
| 1,860,824 | A | 5/1932 | Tate | |
| 1,863,363 | A | 6/1932 | Zworykin | 350/272 |
| 1,971,534 | A | 8/1934 | Peace, Jr. | |
| 2,042,700 | A | 6/1936 | Colvin | |
| 2,139,431 | A | 12/1938 | Vatter | 228/208 X |
| 2,179,500 | A | 11/1939 | Diehl | |
| 2,204,367 | A | 6/1940 | Kollsman | |
| 2,237,193 | A | 4/1941 | Mobsby | |
| 2,287,246 | A | 6/1942 | Hess | 431/348 |
| 2,303,873 | A | 12/1942 | Anderson | 219/354 |
| 2,336,816 | A | 12/1943 | Thompson | 431/100 |
| 2,432,669 | A | 12/1947 | Kliever | |
| 2,466,024 | A | 4/1949 | Hall | |
| 2,466,311 | A | 4/1949 | Hall | |

(Continued)

FOREIGN PATENT DOCUMENTS

| EP | 0400157 | 7/1984 | ............. A61N 1/365 |
|---|---|---|---|
| EP | 0494834 | 1/1992 | ............... A61B 5/05 |

(Continued)

OTHER PUBLICATIONS

Vestrand, D., Gamma-Ray Astronomy, 2003, Encyclopedia or Physical Science and Technology (3d ed.), p. 397-432 (Year: 2003).*

(Continued)

*Primary Examiner* — Derek N Mueller
(74) *Attorney, Agent, or Firm* — Hayes Soloway P.C.

(57) ABSTRACT

A system for neutralizing exhaust gases from an aircraft at altitude includes a turbofan jet engine. The turbofan jet engine creates exhaust gases. An exhaust is located within the turbofan jet engine. The exhaust has an interior volume. At least one corona discharge unit is located within the interior volume of the exhaust. The at least one corona discharge unit creates electrical discharges comprising high-speed relativistic electrons and gamma rays within the exhaust. The exhaust gases and the electrical discharges are directed to interact with one another in the interior volume of the exhaust. The interaction generates positively charged plasma ions within the exhaust gases. The exhaust gases are neutralized before leaving the turbofan jet engine.

20 Claims, 9 Drawing Sheets

(56) References Cited

U.S. PATENT DOCUMENTS

| | | | | |
|---|---|---|---|---|
| 2,667,432 | A | 1/1954 | Nolte | 428/702 X |
| 2,677,748 | A | 5/1954 | Naylor | 219/354 |
| 2,761,959 | A | 9/1956 | Kunins | 350/272 |
| 3,045,223 | A | 7/1962 | Kapany et al. | |
| 3,054,694 | A | 9/1962 | Aves, Jr. | 428/627 |
| 3,088,271 | A | 5/1963 | Smith | 431/5 |
| 3,108,171 | A | 10/1963 | Vary | 219/347 |
| 3,289,409 | A | 12/1966 | Schirmer | 60/205 |
| 3,291,189 | A | 12/1966 | Schade, Jr. | 431/328 |
| 3,324,924 | A | 6/1967 | Hailstone et al. | 431/328 |
| 3,364,914 | A | 1/1968 | Bryan | 431/328 |
| 3,445,662 | A | 5/1969 | Langley | 219/354 |
| 3,516,772 | A | 6/1970 | Strauss | 431/158 |
| 3,517,505 | A | 6/1970 | Anderson et al. | 60/39.5 |
| 3,663,917 | A | 5/1972 | Mahmoodi | 338/28 |
| 3,678,751 | A | 7/1972 | Mead et al. | 73/362 |
| 3,703,635 | A | 11/1972 | Burkarth | 350/1 |
| 3,797,395 | A | 3/1974 | Tyroler | |
| 3,866,472 | A | 2/1975 | Witt | 73/362 |
| 3,875,925 | A | 4/1975 | Johnston | 126/270 |
| 3,901,036 | A | 8/1975 | Martin | 126/270 |
| 3,939,818 | A | 2/1976 | Hamilton et al. | 126/270 |
| 3,976,270 | A | 8/1976 | Catchpole | |
| 3,996,787 | A | 12/1976 | Edgington | |
| 4,053,127 | A | 10/1977 | Edgington | |
| 4,054,255 | A | 10/1977 | Magenheim | |
| 4,058,787 | A | 11/1977 | Ichikawa et al. | 338/22 |
| 4,095,456 | A | 6/1978 | Edgington | |
| 4,129,848 | A | 12/1978 | Frank et al. | 338/308 |
| 4,135,489 | A | 1/1979 | Jarvinen | F24J 3/02 |
| 4,140,109 | A | 2/1979 | Savic et al. | 128/2.1 |
| 4,166,389 | A | 9/1979 | Montren | 73/343 |
| 4,252,130 | A | 2/1981 | Le Pivert | 128/734 |
| 4,415,133 | A | 11/1983 | Phillips | 244/53 R |
| 4,437,084 | A | 3/1984 | Clayton, Jr. | 338/22 |
| 4,453,835 | A | 6/1984 | Clawson et al. | 374/185 |
| 4,457,633 | A | 7/1984 | Andrews | 374/209 |
| 4,553,137 | A | 11/1985 | Marxer et al. | |
| 4,567,110 | A | 1/1986 | Jarvinen | C23C 15/00 |
| 4,745,804 | A | 5/1988 | Goldberg et al. | |
| 4,766,369 | A | 8/1988 | Weinstein | |
| 4,766,725 | A | 8/1988 | Singh | 60/204 |
| 4,796,153 | A | 1/1989 | Amason et al. | |
| 4,819,480 | A | 4/1989 | Sabin | |
| 5,095,754 | A | 3/1992 | Hsu et al. | |
| 5,140,135 | A | 8/1992 | Freeman | |
| 5,191,791 | A | 3/1993 | Gerardi et al. | |
| 5,206,805 | A | 4/1993 | Petzold et al. | |
| 5,281,091 | A | 1/1994 | Dooley et al. | F02C 7/047 |
| 5,301,905 | A | 4/1994 | Blaha | |
| 5,394,340 | A | 2/1995 | Inkpen et al. | |
| 5,398,547 | A | 3/1995 | Gerardi et al. | |
| 5,474,261 | A | 12/1995 | Stolarczyk et al. | |
| 5,518,205 | A | 5/1996 | Wurst et al. | 244/58 |
| 5,521,584 | A | 5/1996 | Ortolano et al. | |
| 5,523,959 | A | 6/1996 | Seegmiller | |
| 5,551,288 | A | 9/1996 | Geraldi et al. | |
| 5,569,850 | A | 10/1996 | Rauckhorst, III | |
| 5,621,332 | A | 4/1997 | Inkpen et al. | |
| 5,621,400 | A | 4/1997 | Corbi | |
| 5,647,868 | A | 7/1997 | Chinn | 606/21 |
| 5,652,522 | A | 7/1997 | Kates et al. | |
| 5,686,841 | A | 11/1997 | Stolarczyk et al. | |
| 5,760,711 | A | 6/1998 | Burns | |
| 5,790,026 | A | 8/1998 | Lardiere, Jr. et al. | 340/581 |
| 5,800,487 | A | 9/1998 | Mikus et al. | 607/105 |
| 5,874,672 | A | 2/1999 | Gerardi et al. | |
| 5,886,256 | A | 3/1999 | Deanna | 340/962 |
| 5,899,897 | A | 5/1999 | Rabin et al. | 606/21 |
| 5,899,899 | A | 5/1999 | Arless et al. | 606/22 |
| 5,906,612 | A | 5/1999 | Chinn | 606/20 |
| 5,955,887 | A | 9/1999 | Codner et al. | |
| 6,105,695 | A | 8/2000 | Bar-Cohen et al. | 180/8.5 |
| 6,112,843 | A | 9/2000 | Wilcox et al. | 180/345 |
| 6,140,658 | A | 10/2000 | Jarvinen | G01J 1/00 |
| 6,166,661 | A | 12/2000 | Anderson et al. | |
| 6,175,163 | B1 | 1/2001 | Rinaldi et al. | 290/6 |
| 6,190,378 | B1 | 2/2001 | Jarvinen | A61B 17/36 |
| 6,304,194 | B1 | 10/2001 | McKillip | 340/962 |
| 6,320,511 | B1 | 11/2001 | Cronin et al. | |
| 6,328,467 | B1 | 12/2001 | Keyhani | |
| 6,384,611 | B1 | 5/2002 | Wallace et al. | |
| 6,407,535 | B1 | 6/2002 | Friedman et al. | 322/2 R |
| 6,425,286 | B1 | 7/2002 | Anderson et al. | |
| 6,430,996 | B1 | 8/2002 | Anderson et al. | |
| 6,488,306 | B1 | 12/2002 | Shirey et al. | 280/474 |
| 6,608,489 | B2 | 8/2003 | Yankielun et al. | |
| 6,653,598 | B2 | 11/2003 | Petrenko et al. | |
| 6,679,112 | B2 | 1/2004 | Collot et al. | |
| D487,715 | S | 3/2004 | Lindemann et al. | D12/1 |
| D488,093 | S | 4/2004 | Lindema_Nn et al. | D12/1 |
| 6,731,225 | B2 | 5/2004 | Vopat | |
| 6,817,240 | B2 | 11/2004 | Collot et al. | |
| 6,847,903 | B2 | 1/2005 | Severson et al. | 702/54 |
| 6,875,991 | B1 | 4/2005 | Jarvinen et al. | G01J 1/00 |
| 6,879,168 | B2 | 4/2005 | Baas et al. | |
| 6,995,572 | B2 | 2/2006 | Arndt et al. | |
| 7,000,871 | B2 | 2/2006 | Barre et al. | 340/580 |
| 7,124,630 | B2 | 10/2006 | Hanson et al. | |
| 7,155,968 | B2 | 1/2007 | Collot et al. | |
| 7,439,877 | B1 | 10/2008 | Jarvinen | G08B 21/00 |
| 7,439,887 | B2 | 10/2008 | Leung | 341/106 |
| 7,514,804 | B2 | 4/2009 | Wang | 290/1 R |
| 7,592,783 | B1 | 9/2009 | Jarvinen | H02N 1/00 |
| 7,654,073 | B2 | 2/2010 | Primlani | 60/39.183 |
| 7,897,214 | B2 | 3/2011 | Poullos | B05D 1/06 |
| 7,898,789 | B1 | 3/2011 | Jarvinen | H05F 3/00 |
| 8,006,934 | B2 | 8/2011 | Alexander et al. | F02C 7/047 |
| 8,060,334 | B1 | 11/2011 | Jarvinen | G01K 17/00 |
| 8,159,357 | B1 | 4/2012 | Jarvinen | G08B 19/02 |
| 8,522,522 | B2 | 9/2013 | Poisson | F01D 15/10 |
| 9,133,714 | B2 | 9/2015 | Vontell | F01D 5/147 |
| 9,642,190 | B2 | 5/2017 | Jarvinen | F01D 15/10 |
| 2006/0137355 | A1 | 6/2006 | Welch et al. | B64D 41/007 |
| 2013/0118180 | A1* | 5/2013 | Bayer | F01N 3/08 60/775 |
| 2014/0366552 | A1 | 12/2014 | Szwedowicz | F02C 7/047 |
| 2015/0377129 | A1 | 12/2015 | Ward | F01D 15/10 |
| 2016/0138419 | A1 | 5/2016 | Kray et al. | F01D 9/02 |
| 2016/0353523 | A1 | 12/2016 | Jarvinen | F02C 7/047 |

FOREIGN PATENT DOCUMENTS

| | | | |
|---|---|---|---|
| EP | 1156189 | 11/2001 | F01D 5/18 |
| FR | 1143271 | 9/1957 | 350/272 |
| GB | 681186 | 10/1952 | F02C 7/047 |
| RU | 1532868 | 12/1989 | |

OTHER PUBLICATIONS

Chang, J., Corona Discharge Processes, 1991, IEEE Transactions on Plasma Science, vol. 19, No. 6, p. 1152-1166 (Year: 1991).*

Pasztor, "Airline Regulators Grapple with Engine-Shutdown Peril", http://online.wsj.com/article/SB120753185285993925.html, The Wall Street Journal, Apr. 7, 2008, accessed Aug. 20, 2015, 7 pgs.

Norris, "Core Engine Icing Strikes Russian 747-8F", http://www.avaiationweek.com/Article/aspx?id=article-xml/AW_09_02_2013_p20-610669.xml/, accessed Aug. 20, 2015, 4 pgs.

Reuters, "Boeing Warns of Icing Risk on Some Planes", The New York Times, Nov. 23, 2013, http://www.nytimes.com/2013/11/24/busikness/boeing-warns-of-icing-risk-on-some-planes.html?r=0, accessed Aug. 20, 2015, 2 pgs.

Reuters, "Boeing issues warning: Further icing problems with GE GenX engines on Boeing aircraft", http://ktwop.worldpress.com/2013/11/23/further-icing-problems-with-ge-genx-engines-on-boeing aircraft/, accessed Aug. 20, 2015, 5 pgs.

Norris, "JAL Surprises Boeing, GE with 787 Withdrawals", http://www.aviationweek.com/Articles.aspx?id=article-xml/AW_12_02_2013_p30-640739.xml/, accessed on Aug. 20, 2015, 3 pgs.

Staunton, et al., "Evaluation of 2004 Toyota Prius Hybrid Electric Drive System", ORNL/TM-2006-423, May 2005, http://www.engr.uvic.ca/~mech459/Pub_References/890029.pdf/., 95 pgs.

(56) References Cited

OTHER PUBLICATIONS

Burres, et al., "Evaluation of the 2007 Toyota Camry Hybrid Synergy Drive System", ORNL/TM-2007/190, Apr. 2008, http://www.osti.gov/scitech/servlets/purl/928864, 102 pgs.

Burres, et al., "Evaluation of the 2008 Lexus LS 600H Hybrid Synergy Drive System", ORNL/TM-2008/185, Jan. 2009, http://www.osti.gov/scitech/biblio/947393/, 91 pgs.

Staunton, et al., "Evaluation of 2005 Honda Accord Hybrid Electric Drive System", Ornl/TM-2006-535, Sep. 2006, 34 pgs.

Aydin, et al., "Axial Flux Permanent Magnet Disc Machines: A Review", lipo.ece.wisc.edu/2004pubs/2004_10 pdf/, retrieved on Aug. 20, 2015, 13 pgs.

"Fan Blades: Titanium Vs Composite", http://www.airliners.net/aviation-forums/tech_ops/read.main/318537/. accessed on Aug. 20, 2015, 9 pgs.

Lightning Strike Protection for Composite Structures, Gardiner, Ginger, Jul. 2006, http://wwv.compositesworld.com/articles/lightening-strike-protection-for-composite-structures, accessed Aug. 20, 2015, 7 pgs.

Jarvinen, "A Flywheel Energy Storage and Conversion System for Photovoltaic Applications-Final Report", Doe/Et/20279-159, Mar. 1982, 227 pgs.

Maskell "The Effect of Humidity on a Corona discharge in Air", Technical Report 70106, u.d.c.533.276: 621.3015.532, Royal Aircraft Establishment, Jun. 1970, 26 pgs.

Fishman et al., "Discovery of Intense Gamma-Ray Flashes of Atmospheric Origin", *Science*, New Series, vol. 264, No. 5163, May 27, 1994, pp. 1313-1316.

Dwyer, et al., "High-energy electron beams launched into space by thunderstorms", *Geophysical Research Letters*, vol. 35, L02815, 2008, 5 pgs.

Chu, "MIT engineers fly first-ever plan with no moving parts", *MIT News*, Nov. 21, 2018, 11 pgs.

"Contrail", https://en.wikipedia.org/wiki/Contrail, accessed Mar. 18, 2021, 10 pgs.

"Corona discharge", https://enswikipedia.org/wild/Corona discharge, accessed Mar. 18, 2021, 10 pgs.

"Lightning", https://en.wikipedia.org/wiki/Lightning accessed Mar. 18, 2021, 36 pgs.

"Turbofan", https://en.wikipedia.org/wiki/Turbofan, accessed Mar. 18, 2021, 28 pgs.

"Electric motor", https://en.wikipedia.org/wiki/Electric_motor, accessed Mar. 18, 2021, 32 pgs.

"Plasma (physics)", Itps://en.wikipedia.org/wild/Plasma (physics) accessed Mar. 18, 2021, 24 pgs.

"Terrestrial gamma-ray flash", https://en.wikipedia.org/wiki/Terrestrial gamma-ray flash, accessed Mar. 18, 2021, 8 pgs.

"Paschen's law", https://en.wikipedia.org/wiki/Paschen%27s law, accessed Mar. 18, 2021, 8 pgs.

"Hygh-bypass engines of the future", *AeroReport*, https://aeroreport.de/en/innovation/high-bypass-engines-of-the-future, Feb. 2018, 10 pgs.

Nica et al., "Precise measurement of $\alpha k$ for the 88.2-keV M4 transition in Te: est of internal-conversion theory", Petersburg Nuclear Physics Institute, Russia, Jul. 11, 2018, 7 pgs.

Schweber, "Ion-Driven Model Aircraft Flies without Moving Parts", *Electronic Design*, https://www.electronicdesign.com/power-management/article/21807485/iondriven-model-aircraft-flies-without-moving-parts#:~:text=Disproving, Jan. 16, 2019, 13 pgs.

\* cited by examiner

AIRCRAFT EXHAUST MITIGATION SYSTEM AND PROCESS

FIELD OF THE DISCLOSURE

The present disclosure is generally related to the field of aviation and more particularly is related to systems and methods to reduce the effects of jet-powered aircraft on the Earth's climate.

BACKGROUND OF THE DISCLOSURE

The number of turbofan jet-powered aircraft operating in the world is sizeable: it numbered 23,000 aircraft in the year 2016 and is expected to double by the year 2040. The number of flights during a single day is estimated at over 18,200 with the heaviest air traffic period during the day being on Friday between 2 pm and 4 pm when 12,850 planes carrying 1,590,929 people are listed as being sky-bound at the same moment.

One of the significant problems on earth is the debilitating effects on the earth's climate caused by turbofan jet engine propelled aircraft that cruise in the upper atmosphere and burn fossil fuels. When this type of jet engine burns fossil fuels, it produces greenhouse gases that contain carbon dioxide and water vapor that are expelled into the earth's atmosphere. At cruising altitudes, the water vapor freezes into white icy-like snowflakes, called contrails, that interfere with the radiation balance of the earth, and cause the atmosphere to heat up. The resulting heat causing climate change in the form of the melting of ice sheets and glaciers and storms of greater velocity and temperature extremes on earth.

Various ways to combat contrails have been proposed. One method focuses on the formation of ice crystals that are of smaller size to lower the reflectivity and or the physical size of the white icy-like snowflakes. This is achieved by the introduction of chemicals and particles into the exhaust whose condensation nuclei are reduced in size, forming smaller ice crystals. There are numerousdisadvantages to these approaches, including the weight of the equipment that must be added to the aircraft to dispense the chemicals or particles, as well as the substantial weight of the materials that must themselves be dispensed. This additional weight markedly shortens the aircraft's cruising range and increases flight costs dramatically.

SUMMARY OF THE DISCLOSURE

Embodiments of the present disclosure provide a system and method for neutralizing exhaust gases from an aircraft at altitude. Briefly described, in architecture, one embodiment of the system, among others, can be implemented as follows. A system for neutralizing exhaust gases from an aircraft at altitude includes a turbofan jet engine. The turbofan jet engine creates exhaust gases. An exhaust is located within the turbofan jet engine. The exhaust has an interior volume. At least one corona discharge unit is located within the interior volume of the exhaust. The at least one corona discharge unit creates electrical discharges comprising high-speed relativistic electrons and gamma rays within the exhaust. The exhaust gases and the electrical discharges are directed to interact with one another in the interior volume of the exhaust. The interaction generates positively charged plasma ions within the exhaust gases. The exhaust gases are neutralized before leaving the turbofan jet engine.

The present disclosure can also be viewed as providing a nozzle apparatus for a turbofan jet engine. Briefly described, in architecture, one embodiment of the apparatus, among others, can be implemented as follows. The nozzle apparatus includes an exhaust having an interior volume. At least one corona discharge unit is located within the interior volume of the exhaust. The at least one corona discharge unit creates electrical discharges comprising high-speed relativistic electrons and gamma rays within the exhaust. A plurality of solenoids is located about a circumference of the exhaust. The plurality of solenoids creates a magnetic field within the exhaust. Exhaust gases in the interior volume are directed to interact with the electrical discharges in the interior volume of the exhaust. The interaction generates positively charged plasma ions within the exhaust gases. The magnetic field directs the plasma ions out of the exhaust. The exhaust gases are neutralized before leaving the turbofan jet engine.

The present disclosure can also be viewed as providing methods of neutralizing exhaust gases from an aircraft at altitude. In this regard, one embodiment of such a method, among others, can be broadly summarized by the following steps: directing exhaust gases through an exhaust having an interior volume; creating, with at least one corona discharge unit located within the interior volume of the exhaust, electrical discharges comprising high-speed relativistic electrons and gamma rays; interacting the exhaust gases and the electrical discharges with one another in the interior volume of the exhaust; and generating, by the interaction, positively charged plasma ions within the exhaust gases, thereby neutralizing the exhaust gases.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The fundamental problem causing the formation of contrails in the earth's atmosphere and their related climate change effects is the ejection of greenhouse gases from jet engines into the atmosphere, as the turbofan engines burn fossil fuels during aircraft cruise conditions. This causes the production of gaseous water vapor, which freezes and forms white icy-like snowflakes.

Figure 1:
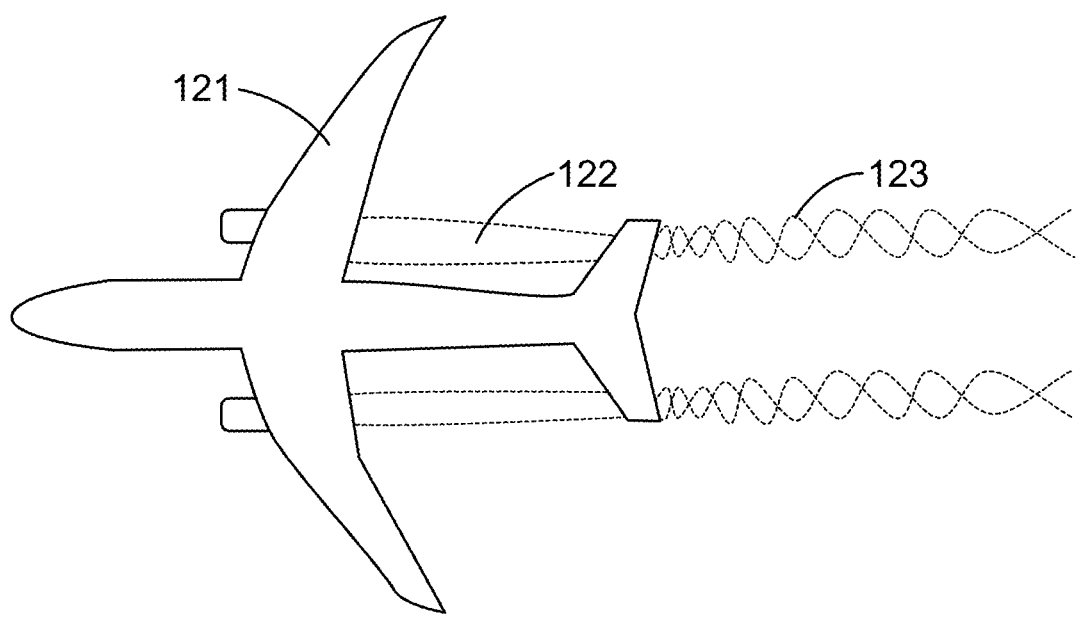
FIG. 1 is a diagrammatic overhead illustration of a jet aircraft at high altitude, in accordance with a first exemplary embodiment of the present disclosure.

FIG. 1 is a diagrammatic overhead illustration of a jet aircraft 121 at high altitude, in accordance with a first exemplary embodiment of the present disclosure. A twin-engine aircraft 121 is shown in flight. The aircraft 121 may release greenhouse gases, 122 from each of its engines. Near the aircraft 121, the temperature of the released gases 122 initially remains at the ambient engine temperature, which is quite warm. The released gases 122 may initially remain visually transparent to an observer viewing the highflying aircraft as it passes directly overhead.

For reasons of aerodynamic and propulsion efficiency, aircraft with turbofan jet engines are designed to cruise at altitudes between 32,000 feet and 42,000 feet. The Earth's atmospheric air temperature decreases with increasing altitude, reaching a temperature of 32° F. at an altitude of 25,000 feet, and then reaching a slightly cooler temperature of 26.5° F. a few thousand feet altitude higher. At average cruising altitudes, the local ambient air temperature is between approximately −53° F. and −63° F. The released gases 122 may mix with the colder atmospheric air and cause the gaseous water vapor component to freeze and form white icy-like snowflakes 123, which interfere with the earth's radiation balance by reflecting sunlight away from the Earth and retaining radiation within the Earth. The resulting contrail-filled overcast left behind at cruising altitude is persistent due to the large number of aircraft cruising through the skies.

Figure 2:
FIG. 2 is a diagrammatic illustration of a satellite image showing persistent frozen contrails deposited in the upper earth's atmosphere, in accordance with the first exemplary embodiment of the present disclosure.

FIG. 2 is a diagrammatic illustration of a satellite image showing persistent frozen contrails 231 deposited in the upper earth's atmosphere, in accordance with the first exemplary embodiment of the present disclosure. As described above relative to FIG. 1, when numerous turbofan powered aircraft pass through the same below zero temperature regions of the upper atmosphere, the atmosphere is filled with a white icy-like snowflake overcast. Icy-like snowflake deposits released behind by the jet aircraft 121 remain in the atmosphere as frozen contrails 231, which are observable from orbit using satellite imaging. The contrails cover a significant portion of the land 232 below them.

Figure 3:
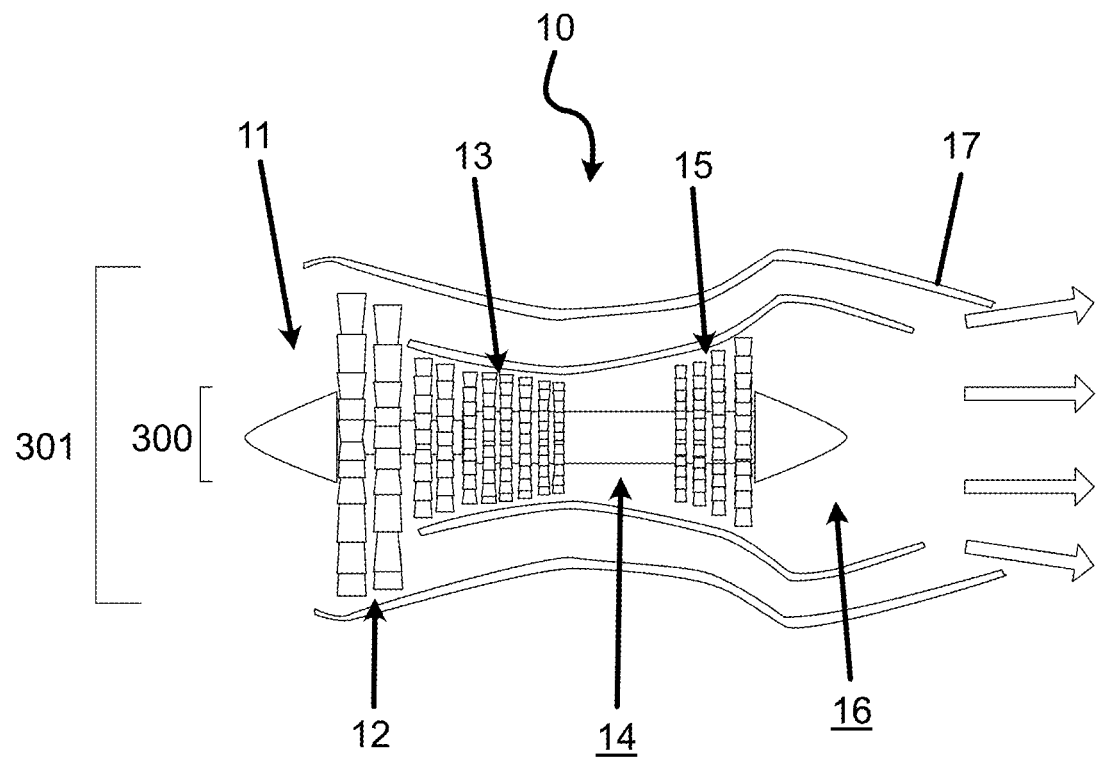
FIG. 3 is a cross-sectional illustration of a dual-shaft turbofan aircraft engine.

FIG. 3 is a cross-sectional illustration of a dual-shaft turbofan aircraft engine 10. The engine 10 may include an internal inlet 11, through which air may enter the engine 10. A fan 12 may compress noncombustible outer inlet air as it travels through the outer compartment of the engine 10. A compressor 13 may increase the pressure of the combustible air within the engine 10. Fuel may be burned in a combustion chamber 14, which may drive heated air through the blades of a turbine 15 to provide power to the aircraft. An exhaust section 16 directs the air to mix with noncombustible air in the nozzle 17 to produce a high velocity jet, propelling the aircraft.

Modern day turbofan engines 10, whether they are of the two shaft, three shaft, experimental design or reduced fan speed varieties are formed in two major parts: a central nacelle enclosed part 300 containing the "turbo" combustion unit and a second surrounding nacelle part 301, about the first nacelle 300, used to accelerate an associated air stream. The central nacelle 300 consists of the machinery used to first compress the inlet air, then burn the air with fossil fuel in the combustion chamber 14, pass the combusted air through high-pressure and low-pressure turbine sections 15 and then exhaust the combusted air through the engine exhaust nozzle 16, 17 into the surrounding atmosphere. During passage of the exhaust gases through the engine 10, energy is extracted from the engine 10's low pressure turbine section 15 and used to power the exterior fan 12 which accelerates separate noncombusted inlet air within the second enclosing nacelle 301 about the central nacelle 300.

As discussed above relative to FIGS. 1-2, this process produces greenhouse gases—carbon dioxide and water vapor—that interfere with the radiation balances in the Earth's atmosphere. The imbalance causes the Earth's atmospheric temperature to rise which results in melting of the Earth's ice sheets and glaciers, as well as causing atmospheric storms to become substantially energized.

Figure 4:
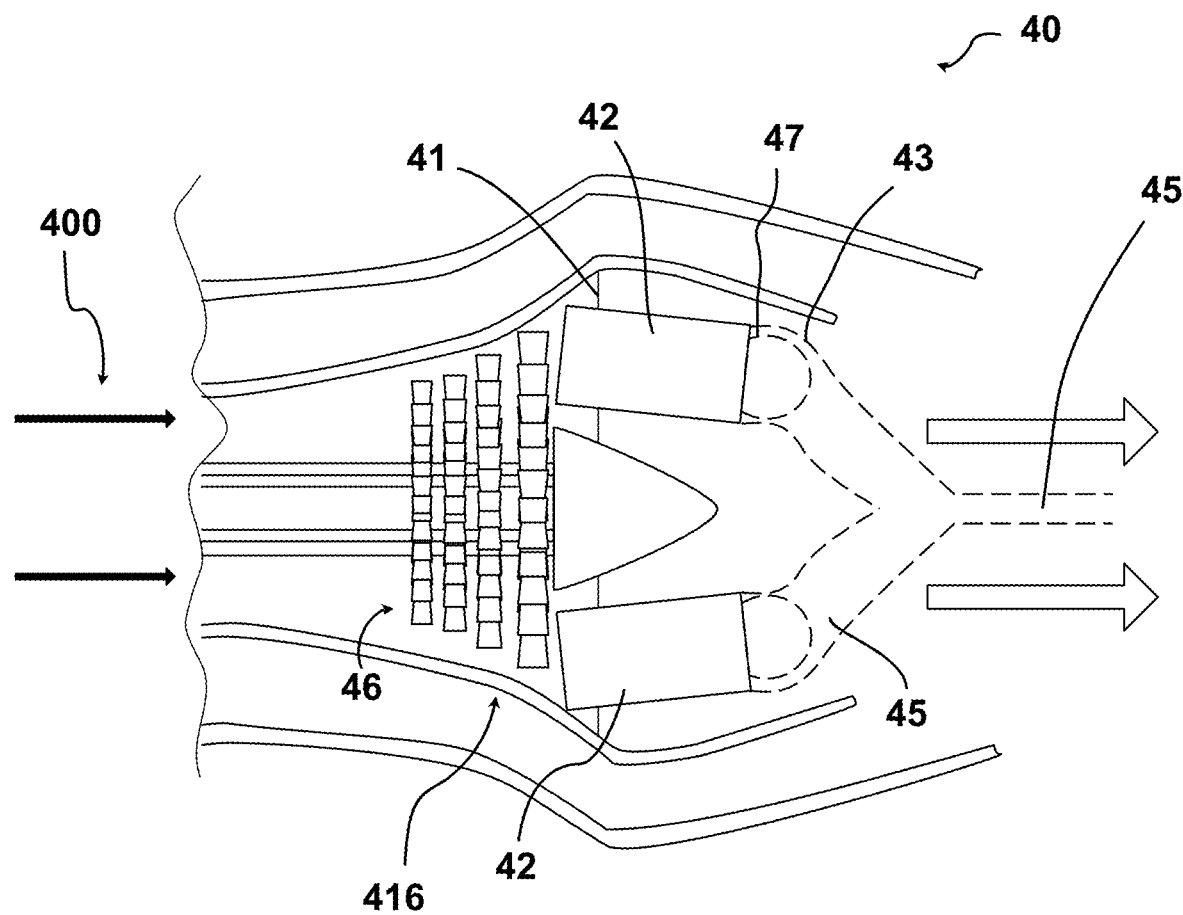
FIG. 4 is a cross-sectional illustration of a system for neutralizing exhaust gases from an aircraft at altitude, in accordance with the first exemplary embodiment of the present disclosure.

FIG. 4 is a cross-sectional illustration of a system 40 for neutralizing exhaust gases from an aircraft at altitude, in accordance with the first exemplary embodiment of the present disclosure. The system 40 includes a turbofan jet engine 10, shown in FIG. 3 above. The turbofan jet engine 10 creates exhaust gases 400. An exhaust 416 is located within the turbofan jet engine 10. The exhaust 416 has an interior volume. At least one corona discharge unit 42 is located within the interior volume of the exhaust 416. One or more plates or struts 41 are positioned to hole the at least one corona discharge unit 42 in place. In one example, the plates or struts 41 is a planar structure that fills the interior but lets the gas pass through at the corona discharge unit 42. The at least one corona discharge unit 42 creates electrical discharges comprising high-speed relativistic electrons and gamma rays 47 within the exhaust 416. The exhaust gases 400 and the electrical discharges are directed to interact with one another in the interior volume of the exhaust 416. The interaction generates positively charged plasma ions 45 within the exhaust gases 400. The exhaust gases 400 are neutralized before leaving the turbofan jet engine 10.

With reference to FIG. 3, the exhaust 416 may operate in place of the exhaust 16 shown in the prior art engine 10. That is, the system 40 may replace a portion of current turbofan jet engines 10 or may be used in new turbofan jet engine designs. Exhaust gases 400 may be directed into the exhaust 416 from the combustion chamber 14. Exhaust gases 400 entering the exhaust 416 from the upstream turbine section 46 contain greenhouse gases which may be directed through open areas of the corona discharge units 42 located about the circumference of the exhaust 416.

The at least one corona discharge unit 42 may be located within the interior volume of the exhaust 416. In one example, the system 40 may include at least two corona discharge units 42. The corona discharge units 42 may be located on opposite sides of the interior volume of the exhaust 416. In other words, a first corona discharge unit 42 may be located at a first circumferential location, along a circumference of the exhaust 416, and a second corona discharge unit 42 may be located at a second, different circumferential location along the circumference of the exhaust 416. In another example, additional corona discharge units 42 may be located at subsequent circumferential locations within the exhaust 416. In one example, the corona discharge units 42 may be evenly spaced apart. In another example, the corona discharge units 42 may be located in the path of the exhaust gases 400. In one particular example, the corona discharge units 42 may be placed immediately downstream of the low pressure turbine 15, as the engine 10's internal pressure and environmental temperature may be at a minimum in that location. This may allow the corona discharge units 42 to operate with minimal required discharge voltages.

The at least one corona discharge unit 42 may create electrical discharges. Corona electrical discharges may be created through either single electrode discharges or two-electrode discharges. In a single electrode discharge, the voltage on a single electrode may be elevated until a spontaneous discharge occurs from the electrode directly into the space surrounding the electrode without an electrical ground nearby. A two-electrode discharge may employ an electrode in the vicinity of an electrical ground, the voltage is increased until a discharge occurs between the electrode and the electrical ground. This type of discharge is controllable in direction and form between the electrode and the electrical ground. This type of discharge may occur at a lower voltage than the voltage required to achieve a single electrode discharge under the same conditions. A corona discharge unit 42 may be understood to include any components necessary for creating a single electrode discharge or a two-electrode discharge. Depending upon the manufacture, any combination of single and two-electrode discharge units may be employed within the system 40. For example, the system 40 may include one or more single electrode corona discharge units 42, or one or more two-electrode discharge units, or some combination thereof.

The voltage required to produce a two-electrode corona discharge varies directly with the gas pressure surrounding the electrodes. The breakdown voltage is shown to be directly proportional to the product of p times d, where p is the pressure and d is the gap distance (or directly proportional to p for a fixed gap size d). For turbofan jet engines 10, the pressure under cruise conditions in the exhaust 416 is constant in magnitude and much reduced in magnitude from the pressure when the engine is operating at lower altitudes. At 42,000 feet of altitude, the pressure in the exhaust duct has been determined to be 221 PSIA—a pressure of 2.1 atmospheres—and the temperature listed at 1000° F. It has been determined that the variation of measured critical voltage for corona discharge at sea level and atmospheric pressure of one atmosphere is 25 kV. Thus, based on the pressure of 2.1 atmospheres in the exhaust duct of the present invention at 42,000 feet, the voltage required for corona discharge scales to 2.5×(2.1) kV=5.25 kV. Therefore, in one example, the discharge voltage of the at least one corona discharge unit 42 may be about 5.25 kV. In another example, the discharge voltage may be higher than 5.25 kV.

The at least one corona discharge unit 42 may be powered by the engine 10. This may allow the electrical power to be generated initially at 230 volts A/C. The at least one corona discharge unit 42 may be in electrical communication with the engine 10 to generate electric current.

The electrical discharges may comprise high-speed relativistic electrons and gamma rays 47, among other phenomena. The electrons and gamma rays 47 may be created when the at least one corona discharge unit 42 is engaged to create electrical discharges. The electrons and gamma rays 47 may be directed to interact with the exhaust gases 400, which may illuminate the gaseous water vapor molecules in the exhaust gases 400 as they pass through the at least one corona discharge unit 42. This may strip the water vapor molecules of electrons and change the water molecules into a positively charged water vapor ion plasma 45.

In one example, the exhaust gases 400, now comprising positively charged water vapor ion plasma 45, may be directed out of the engine 10. The positively charged plasma 45 may be prevented from forming contrails in the atmosphere. This is because the plasma state of the water vapor, which is missing electrons, does not freeze at the temperatures encountered at cruising altitudes. In discussions in the literature on the transformation of gaseous water vapor into white icy-like snowflakes at temperatures near freezing or slightly below, it is noted that the freezing temperature lowers the translational activity between the molecules which causes intermolecular forces to increase markedly and cause the molecules to coalesce together to form ice. It is noted therein that the atomic structure of the water vapor remains the same in terms of the number of neutrons, protons and electrons present and that the internal activity remains the same in each atom, but the formation of ice is caused only by the increasing intermolecular forces. In the present invention, the induced activity between the positively charged water vapor ions and the magnetic forces prevent the intermolecular forces from acting the same way as they do in the freezing of regular water vapor.

Within the context of this disclosure, the term "neutralize" may be used to refer to the process discussed in detail above, whereby exhaust gases 400 expelled from aircraft at altitude are no longer able to form frozen contrails in the atmosphere. Thus, as used herein, exhaust gases 400 may be considered neutralized after they have formed a sufficient number of positively charged plasma ions. In one example, this may include only a portion of the exhaust gases. In another example, this may include substantially all of the exhaust gases. It should be understood that the term "neutralize," as used herein, is not necessarily referring to the chemical reactive potential of any of the constituent components of the exhaust gases 400.

In another example, downstream of the at least one corona discharge unit 42, the positively charged plasma ions 45 may be exposed to circumferentially swirling magnetic fields. This is discussed in greater detail in FIGS. 5-8.

In another example, the exhaust 416 may be formed from a high Z material, or high atomic number material. This may include any suitable high Z material, including titanium, chromium, vanadium, iron, lead, or any combination thereof. In one example, the high Z material may form the entire exhaust 416 or a substantial portion of the exhaust 416. In another example, the exhaust 416 may be formed at least partially from the high Z material. For instance, the high Z material may be located only where it is likely to interact with gamma rays 47 within the exhaust 416. In one example, the high Z material may form a coating or interior layer of the exhaust 416. In another example, the high Z material may be manufactured integral with the exhaust 416.

Gamma rays 47 produced inside the corona discharge units 42 may be used directly to generate the positively charged water molecule plasma ions 45. If the gamma rays 47 do not interact with the exhaust gases 400, they may continue to radiate from the exits of the corona discharge units 42 and strike the at least portion of the exhaust formed with "Z" materials. Such gamma rays, incident on the high "Z" surfaces, may release lower velocity electrons which interact with carbon dioxide present in the exhaust gases and lower the carbon dioxide loading.

This may cause the carbon dioxide to decompose into carbon monoxide. Two semicircular broken lines 47 indicate the expanding field of remaining gamma rays that exit also from the corona discharge units and continue to expand until they strike the high Z materials forming the interior surfaces of the exhaust 416.

Figure 5:
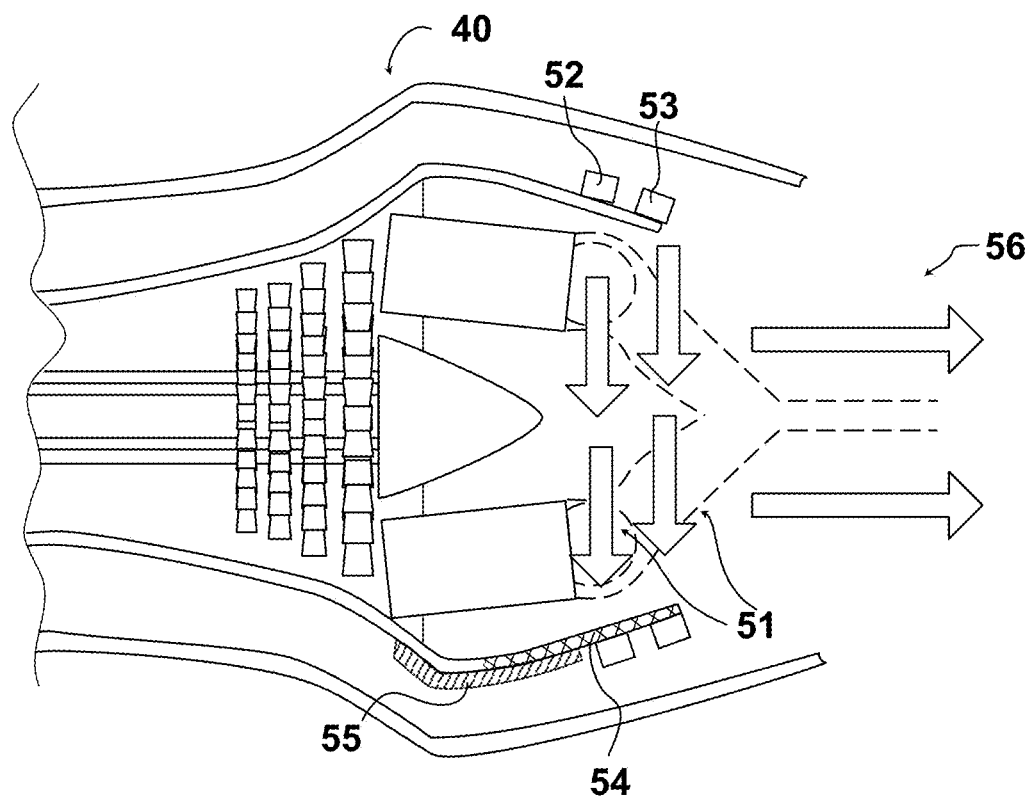
FIG. 5 is diagrammatic cross-sectional illustration showing magnetic fields within the system of FIG. 4, in accordance with the first exemplary embodiment of the present disclosure.

FIG. 5 is diagrammatic cross-sectional illustration showing magnetic fields 51 within the system 40 of FIG. 4, in accordance with the first exemplary embodiment of the present disclosure. With reference to FIG. 4, FIG. 5 shows an exemplary system 40 that includes a plurality of solenoids 52, 53 located about a circumference of the exhaust 416. The plurality of solenoids 52, 53 may create a magnetic field 51 within the system 40 and contemporaneously within exhaust 416 to direct the plasma ions 45. In one example, the magnetic field 51 may be created in a swirling or rotating fashion. The magnetic field 51 may rotate about a longitudinal axis parallel to the central axis of the turbofan jet engine. Electrical cabling 55, supplying electrical energy from the aircraft to the corona discharge units 42, is shown. The high Z material 54 used to form the at least portion of the exhaust 416 is illustrated as well.

The rotating magnetic fields 51 may be created by energizing electrical currents from the aircraft to the electrically wired solenoids 52, 53 wrapped about the exhaust 416. In one example, the plurality of solenoids 52, 53 may be located about an exterior of the exhaust 416. In another example, the plurality of solenoids 52, 53 may be located about the interior of the exhaust 416. In another example, the plurality of solenoids 52, 53 may be located circumferentially about the entire exhaust 416; that is, the solenoids 52, 53 may encircle the exhaust 416. In manufacture, the number of solenoids 52, 53 required to encircle the exhaust 416 may depend upon the size of the exhaust 416, the strength of the magnetic field 51 generated by each solenoid 52, 53, and the desired magnetic field 51 within the exhaust 416. In one example, a first circumferential row of solenoids 52 may be followed by a second circumferential row of solenoids 53 in a downstream position. This may allow the first and second rows of solenoids 52, 53 to generate two independently swirling magnetic fields 51 to control the flow of the exhaust gases 400 with greater precision. It may be understood that any number of rows may be employed as desired.

The rotating magnetic fields 51 may be created by energizing the plurality of solenoids 52, 53 in an order configured to swirl the resultant field 51. In one example, the currents may first be energized on diagonally opposed solenoids 52, 53 and then rapidly switched to adjacent, diagonally opposed solenoids 52, 53, and so on until the full circumference of solenoids 52, 53 have been energized in that order. The process may be repeated to create a continually swirling field 51. The magnetic field interactions between the instantaneous magnetic field 51 direction and the instantaneous local free stream longitudinal plasma 45 may cause Lorentz, v×B, forces to act on the plasma 45. This may simultaneously control the plasma 45 in size and position, as well as accelerate its rotational speed. In one example, the plasma 45 may be directed by the solenoids 52, 53 to rotate about a central axis of the exhaust 416 substantially in line with the turbine 15. In another example, the diameter of the plasma 45 may be reduced by the rotation of the magnetic field 51. Phase shift between the instantaneous velocity vector and the rotating magnetic field 51 and the strength of the magnetic field 51 maybe used to pinch down the plasma stream 45 in size while controlling its rotation rate and agitating the plasma 45. The reduced diameter may cause intermolecular forces between the exhaust gases 400 to be reduced, thereby rendering the exhaust gases 400 neutralized. Agitation of the plasma 45 is used to reduce binding intermolecular forces between water molecule plasma elements to prevent them from collecting together to freeze in the classical sense. In the case of water molecules in standard freezing contrails, such attractive forces cause freezing to occur and the production of white icy-like snowflakes to be produced even though the components constituting the innards of the molecules such as electrons and atoms continue to remain active as usual.

In one example, the exhaust gases 400 may be maintained in a center of the exhaust 416 by the magnetic fields 51 until the exhaust gases 400 are released from the exhaust 416. The locations of the edges of the magnetically displaced plasma 45 are indicated in FIG. 4 by broken lines 43. In one example, static charges on the interior walls of the exhaust 416 and their physical variation along the wall may be used to maintain the plasma exhaust in the center of nozzle until ejection from the engine.

At the downstream end of the exhaust 416, the rotating ion plasma 45 and the remaining altered carbon dioxide gases may be discharged from the exhaust 416, as indicated by arrows 56.

Figure 6:
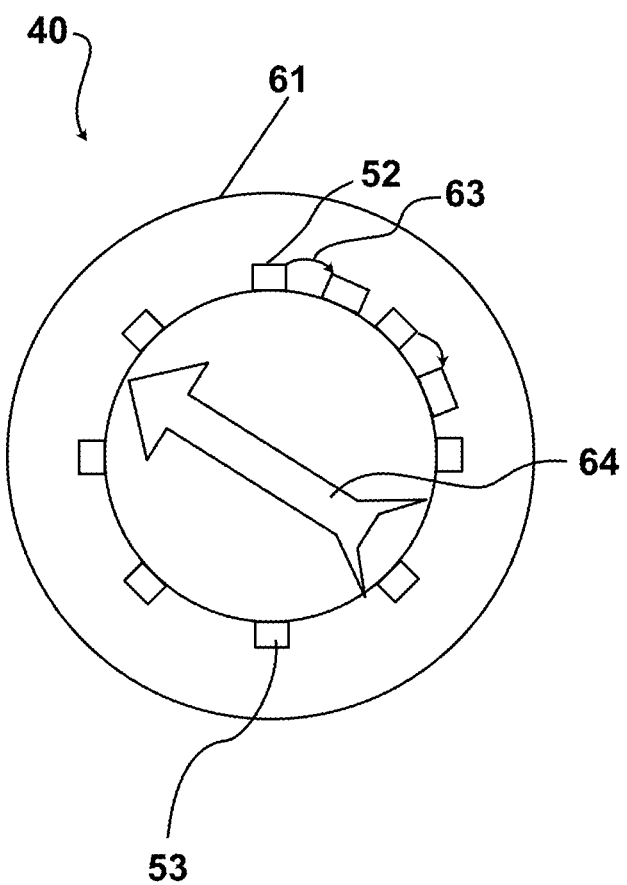
FIG. 6 is a diagrammatic rear view illustration showing magnetic fields of the system of FIG. 4, in accordance with the first exemplary embodiment of the present disclosure.

FIG. 6 is a diagrammatic rear view illustration showing magnetic fields 64 of the system 40 of FIG. 4, in accordance with the first exemplary embodiment of the present disclosure. The view in FIG. 6 is an end view, looking directly upstream into the exhaust 416. The outer turbofan engine nacelle 61, the solenoids 52, 53 and electrical conduits 63, which are connected by wires to the solenoids 52, 53 are shown. Equal and opposite voltages applied to diagonally opposed solenoids create the initial magnetic field 64 with the switching action of the electrical to other adjacent diagonally opposed solenoids 52, 53 following. The switching action causes the magnetic field 64 to rotate about the interior plasma column 45 and cause the changing magnetic field direction to be created which induces the plasma 45 to rotate. When the instantaneous direction of the magnetic field 64 and the instantaneous local free stream velocity of the plasma 45 match, the plasma 45 is swirled circumferentially. When the instantaneous magnetic field 64 and the instantaneous local plasma stream velocity are delayed physically with respect to each other, an additional force vector acting on the plasma 45 reduces its diameter.

Figure 7:
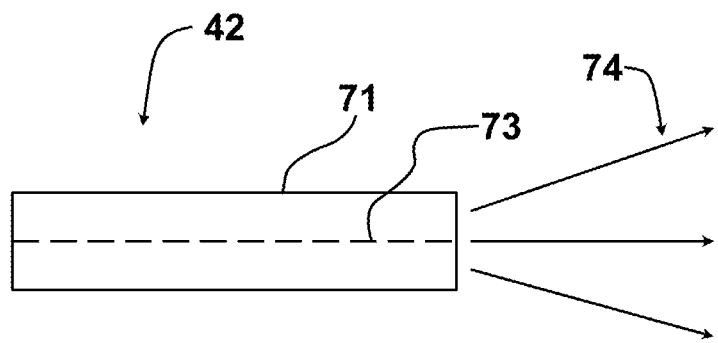
FIG. 7 is a diagrammatic side view illustration showing electrical discharges of the system of FIG. 4, in accordance with the first exemplary embodiment of the present disclosure.
Figure 8:
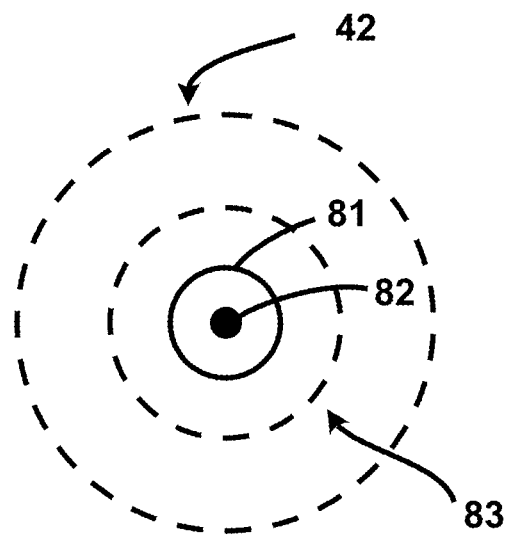
FIG. 8 is a diagrammatic rear view illustration showing electrical discharges of the system of FIG. 4, in accordance with the first exemplary embodiment of the present disclosure.

FIG. 7 is a diagrammatic side view illustration showing electrical discharges of the system 40 of FIG. 4, in accordance with the first exemplary embodiment of the present disclosure. FIG. 8 is a diagrammatic rear view illustration showing electrical discharges of the system of FIG. 4, in accordance with the first exemplary embodiment of the present disclosure.

Corona electrical discharges are formed inside the corona discharge unit 42 between the high voltage wire 73 and the surrounding grounded cylinder 71. Gamma rays 74 propagate radially internal to the cylinder 71 and radially outward from the downstream free end of the corona discharge unit 42. Gamma rays 74 are also generated between the high voltage wire 82 and the grounded cylinder 81, as shown in FIG. 8. The gamma rays 74 expand as indicated by concentric circles 83. It should be noted that FIGS. 4-8 are not illustrated to scale.

Figure 9:
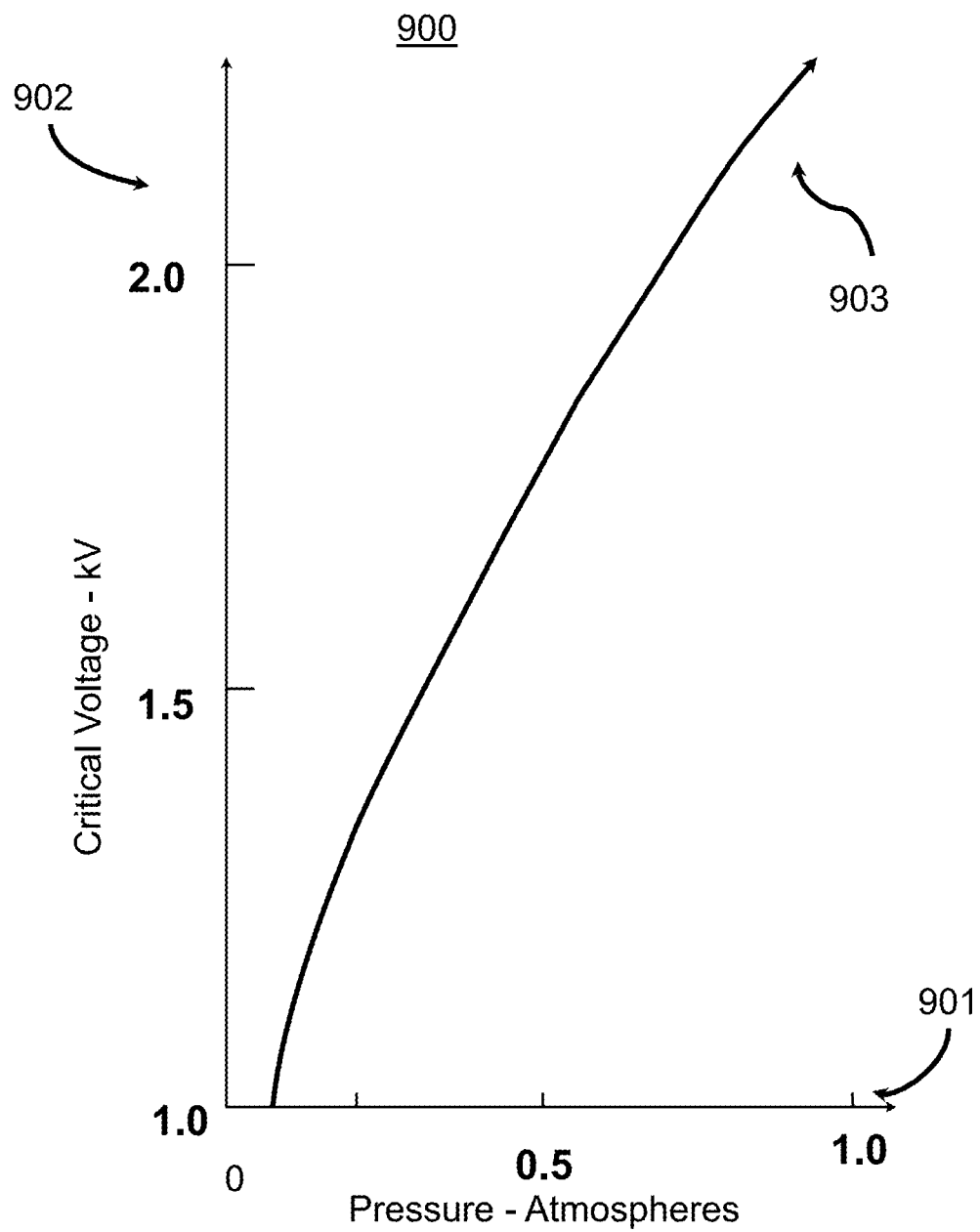
FIG. 9 is a graph showing exemplary critical discharge voltage versus atmospheric pressure for corona dischargers up to one atmosphere, in accordance with the first exemplary embodiment of the present disclosure.

FIG. 9 is a graph 900 showing exemplary critical discharge voltage 902 versus atmospheric pressure 901 for corona discharge units up to one atmosphere, in accordance with the first exemplary embodiment of the present disclosure. The trend line 903 indicates that critical discharge voltage 902 increases as pressure 901 increases up to one atmosphere. The graph 900 shows no effect due to humidity. For pressures greater than one atmosphere, the critical voltage is determined by multiplying the one atmospheric critical value of 2.5 kV by the local pressure in the corona discharge unit. For aircraft propelled by turbofan engines consisting of two or more engines, the direction of the swirling exhausts injected into the local atmosphere are matched to take advantage of the natural separation forces created between the similar rotating vortices.

Figure 10:
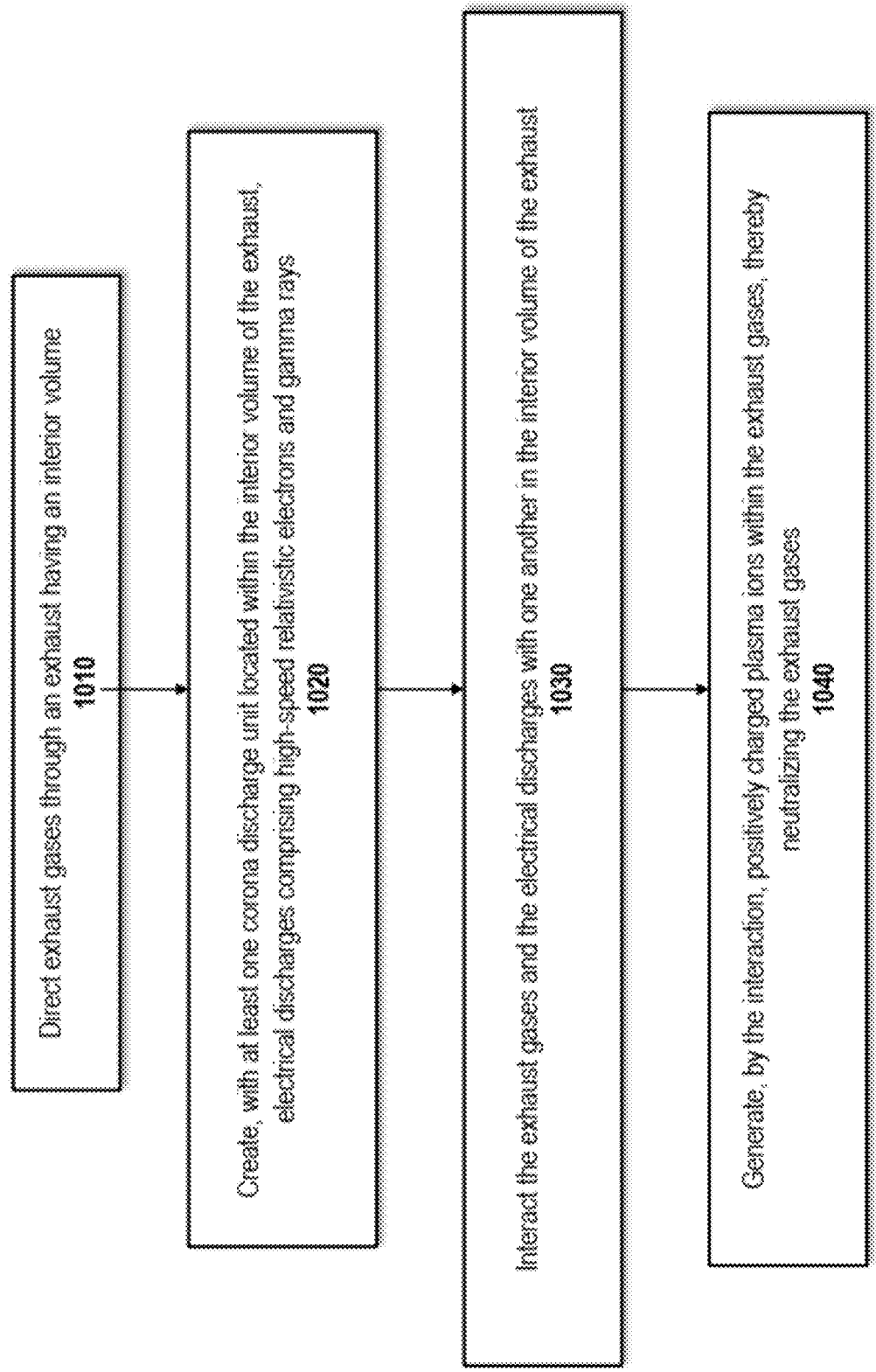
FIG. 10 is a flowchart illustrating a method of neutralizing exhaust gases from an aircraft at altitude, in accordance with the first exemplary embodiment of the present disclosure.

FIG. 10 is a flowchart 1000 illustrating a method of neutralizing exhaust gases from an aircraft at altitude, in accordance with the first exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

Step 1010 includes directing exhaust gases through an exhaust having an interior volume. In one example, the exhaust may be formed from a high Z material.

Step 1020 includes creating, with at least one corona discharge unit located within the interior volume of the exhaust, electrical discharges comprising high-speed relativistic electrons and gamma rays. In one example, the discharge voltage of the at least one corona discharge unit may be about 5.25 kV.

Step 1030 includes interacting the exhaust gases and the electrical discharges with one another in the interior volume of the exhaust.

Step 1040 includes generating, by the interaction, positively charged plasma ions within the exhaust gases, thereby neutralizing the exhaust gases. In one example, gamma rays that do not directly interact with the exhaust gases may become incident upon the high Z material. This may cause the gamma rays to release low speed electrons, which may interact with carbon dioxide in the exhaust gases.

In one example, the method may further include the step of expelling the exhaust gases from the exhaust.

In another example, the method may further include the step of generating a magnetic field within the exhaust to direct the plasma ions, thereby creating a plasma stream. In a particular example, the magnetic field may rotate about a central axis of the exhaust. This may cause the diameter of the plasma stream to be reduced, reducing intermolecular forces between the exhaust gases. In another example, the exhaust gases may be maintained in a center of the exhaust until the exhaust gases are released from the exhaust.

The method may further include any other features, components, or functions disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A system for neutralizing exhaust gases from an aircraft at altitude, comprising:
    a turbofan jet engine creating exhaust gases;
    an exhaust within the turbofan jet engine, the exhaust having an interior volume; and
    at least one corona discharge unit located within the interior volume of the exhaust, the at least one corona discharge unit creating electrical discharges comprising high-speed relativistic electrons and gamma rays within the exhaust,
    wherein the exhaust gases and the electrical discharges are directed to interact with one another in the interior volume of the exhaust, wherein the interaction generates positively charged plasma ions within the exhaust gases, and whereby the exhaust gases are neutralized before leaving the turbofan jet engine.

2. The system of claim 1, comprising a first corona discharge unit at a first circumferential location within the exhaust and a second corona discharge unit at a second circumferential location within the exhaust.

3. The system of claim 1, further comprising a plurality of solenoids located about a circumference of the exhaust, the plurality of solenoids creating a magnetic field within the exhaust to direct the plasma ions.

4. The system of claim 3, wherein the plurality of solenoids is energized in an order configured to cause the plasma ions to rotate about a central axis of the exhaust.

5. The system of claim 3, wherein the plurality of solenoids is located about an exterior of the exhaust.

6. The system of claim 3, further comprising a first row of solenoids and a second row of solenoids.

7. The system of claim 1, wherein a discharge voltage of the at least one corona discharge unit is about 5.25 kV.

8. The system of claim 1, wherein the exhaust is formed from a high Z material, and whereby gamma rays incident on the high Z material release low speed electrons.

9. An apparatus for a turbofan jet engine, comprising:
    an exhaust having an interior volume;
    at least one corona discharge unit located within the interior volume of the exhaust, the at least one corona discharge unit creating electrical discharges comprising high-speed relativistic electrons and gamma rays within the exhaust; and
    a plurality of solenoids located about a circumference of the exhaust, the plurality of solenoids creating a magnetic field within the exhaust,
    wherein exhaust gases in the interior volume are directed to interact with the electrical discharges in the interior volume of the exhaust, wherein the interaction generates positively charged plasma ions within the exhaust gases, wherein the magnetic field directs the plasma ions out of the exhaust, and whereby the exhaust gases are neutralized before leaving the turbofan jet engine.

10. The apparatus of claim 9, comprising a first corona discharge unit at a first circumferential location within the exhaust and a second corona discharge unit at a second circumferential location within the exhaust.

11. The apparatus of claim 9, wherein the plurality of solenoids is energized in an order configured to cause the plasma ions to rotate about a central axis of the exhaust.

12. The apparatus of claim 9, wherein a discharge voltage of the at least one corona discharge unit is about 5.25 kV.

13. The apparatus of claim 9, wherein the exhaust is formed from a high Z material, and whereby gamma rays incident on the high Z material release low speed electrons.

14. A method of neutralizing exhaust gases from an aircraft at altitude, comprising the following steps:
    directing exhaust gases through an exhaust having an interior volume;
    creating, with at least one corona discharge unit located within the interior volume of the exhaust, electrical discharges comprising high-speed relativistic electrons and gamma rays;
    interacting the exhaust gases and the electrical discharges with one another in the interior volume of the exhaust; and
    generating, by the interaction, positively charged plasma ions within the exhaust gases, thereby neutralizing the exhaust gases.

15. The method of claim 14, further comprising the step of expelling the exhaust gases from the exhaust.

16. The method of claim 14, further comprising the step of generating a magnetic field within the exhaust to direct the plasma ions, thereby creating a plasma stream.

17. The method of claim 16, wherein the magnetic field rotates about a central axis of the exhaust.

18. The method of claim 17, further comprising the step of reducing a diameter of the plasma stream to reduce intermolecular forces between the exhaust gases.

19. The method of claim 14, further comprising the step of maintaining the exhaust gases in a center of the exhaust until the exhaust gases are released from the exhaust.

20. The method of claim 14, wherein the exhaust is formed from a high Z material, and further comprising the steps of:
    directing a portion of the gamma rays onto the exhaust, thereby releasing low speed electrons into the interior volume of the exhaust; and
    directing the low speed electrons into contact with the exhaust gases to reduce a presence of carbon dioxide within the exhaust gases.

* * * * *

UNITED STATES PATENT AND TRADEMARK OFFICE
CERTIFICATE OF CORRECTION

PATENT NO. : 11,021,259 B1
APPLICATION NO. : 17/143676
DATED : June 1, 2021
INVENTOR(S) : Jarvinen Page 1 of 1

It is certified that error appears in the above-identified patent and that said Letters Patent is hereby corrected as shown below:

On the Title Page

Title and in the Specification, Column 1, Lines 1-2, should read: --Aircraft Climate Change Elimination--

Page 2, Column 1, Line 61, "5,551,288 A 9/1996 Geraldi et al." should read: --5,551,288A 9/1996 Gerardi et al.--

Page 2, Column 2, Line 16, "D488,093 S 4/2004 Lindema_Nn et al." should read: --D488.093 S 4/2004 Lindemann et al..--

Page 3, Column 2, Line 8, ""Corona discharge", https://enswikipedia.org/wild/Corona discharge, accessed Mar. 18, 2021, 10 pgs." should read: --"Corona discharge", https://en.wikipedia.org/wiki/Corona_discharge, accessed Mar. 18, 2021, 10 pgs.--

Page 3, Column 2, Line 16, ""Plasma (physics)", Itps://en.wikipedia.org/wild/Plasma (physics) accessed Mar. 18, 2021, 24 pgs." should read: --"Plasma (physics)", https://en.wikipedia.org/wiki/Plasma_(physics), accessed Mar. 18, 2021, 24 pgs.--

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*